United States Patent
Hung et al.

(10) Patent No.: US 9,236,808 B1
(45) Date of Patent: Jan. 12, 2016

(54) PARALLEL RESONANT CONVERTER CIRCUIT WITH CURRENT-EQUALIZATION FUNCTION

(71) Applicant: ASIAN POWER DEVICES INC., Taoyuan (TW)

(72) Inventors: Tsung-Liang Hung, Taoyuan (TW); Ya-Lun Ouyang, Taoyuan (TW); Yeu-Torng Yau, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 14/533,103

(22) Filed: Nov. 5, 2014

(30) Foreign Application Priority Data

Jun. 20, 2014 (TW) .............................. 103121525 A

(51) Int. Cl.
  *G05F 1/00* (2006.01)
  *H02M 3/335* (2006.01)
  *H02J 1/10* (2006.01)

(52) U.S. Cl.
  CPC ................................. *H02M 3/33576* (2013.01)

(58) Field of Classification Search
  USPC ............ 323/269, 271, 272; 363/21.02, 64, 65
  See application file for complete search history.

(56) References Cited

U.S. PATENT DOCUMENTS

| | | | | |
|---|---|---|---|---|
| 5,946,206 A * | 8/1999 | Shimizu | ................ | H02M 3/285 363/16 |
| 2010/0328968 A1* | 12/2010 | Adragna | ................ | H02M 3/335 363/21.02 |
| 2012/0262953 A1* | 10/2012 | Jungreis | ................ | H02M 3/285 363/17 |
| 2013/0264909 A1* | 10/2013 | Glaser | ................... | H01L 41/042 310/317 |

* cited by examiner

*Primary Examiner* — Adolf Berhane
*Assistant Examiner* — Gary Nash
(74) *Attorney, Agent, or Firm* — Ding Yu Tan

(57) ABSTRACT

A parallel resonant converter circuit with current-equalization function includes a power input terminal, a power output terminal, an output capacitor, first and second resonant converters and a third transformer. The first resonant converter is electrically coupled between the power input terminal and the output capacitor/power output terminal. The first resonant converter includes a first transformer. The second resonant converter is electrically coupled between the power input terminal and the output capacitor. The first resonant converter and the second resonant converter are coupled in parallel. The second resonant converter includes a second transformer. The third transformer includes a first coil winding set and a second coil winding set. The first coil winding set is electrically coupled between the power input terminal and the first transformer in series. The second coil winding set is electrically coupled between the power input terminal and the second transformer in series.

4 Claims, 1 Drawing Sheet

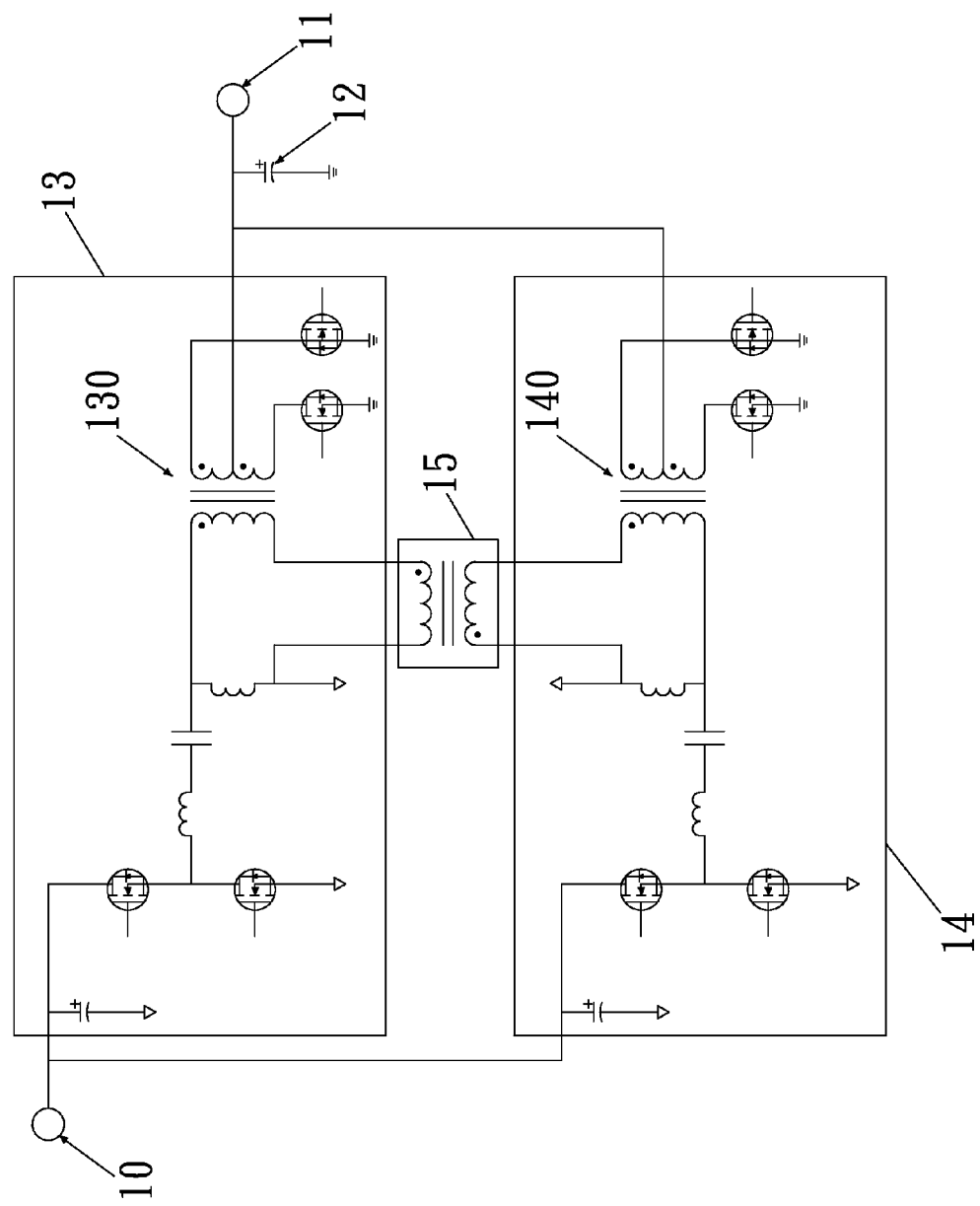

PARALLEL RESONANT CONVERTER CIRCUIT WITH CURRENT-EQUALIZATION FUNCTION

FIELD OF THE INVENTION

The present invention relates to a parallel resonant converter circuit, and more particularly to a circuit structure capable of balancing the output currents of two resonant converters.

BACKGROUND OF THE INVENTION

Because of being capable of providing a qualified conversion efficiency and significantly reducing the switching loss of half-bridge MOSFET, resonant converters are commonly used in DC/DC converters with low-to-medium wattage. However, through employing two sets of resonant converters with the same parameters to share the power conversion load, the resonant converter structure also can apply to the applications required a relatively-high power conversion, thereby reaching the objects of low switching loss, high conversion efficiency and high output power. However, the component parameters of the two parallel resonant converters may have tolerance problems, which may lead to an imbalance between the resonant currents outputted from the two resonant converters, such as one resonant converter may have a larger output power, compared with the other resonant converter. Specifically, the unbalanced output currents may cause the resonant converters to generate an output power greater than the designed rated power when the DC/DC converter is having a full load; and consequentially, the converters may be damaged.

Therefore, a resonant converter capable of solving the aforementioned problems is needed to be developed.

SUMMARY OF THE INVENTION

Therefore, one object of the present invention is to provide a parallel resonant converter circuit capable of balancing the output currents of two resonant converters therein.

The present invention provides a parallel resonant converter circuit with current-equalization function, which includes a power input terminal, a power output terminal, an output capacitor, a first resonant converter, a second resonant converter and a third transformer. The output capacitor includes a first terminal and a second terminal. The first terminal of the output capacitor is electrically coupled to the power output terminal The first resonant converter is electrically coupled between the power input terminal and the output capacitor. The first resonant converter includes a first transformer. The second resonant converter is electrically coupled between the power input terminal and the output capacitor. The first resonant converter and the second resonant converter are coupled in parallel. The second resonant converter includes a second transformer. The third transformer includes a first coil winding set and a second coil winding set. The first coil winding set is electrically coupled between the power input terminal and the first transformer in series. The second coil winding set is electrically coupled between the power input terminal and the second transformer in series.

In one embodiment, the third transformer is a balanced transformer having a turns ratio 1:1.

The present invention further provides a parallel resonant converter circuit with current-equalization function, which includes a power input terminal, an output capacitor, a plurality of resonant converters and a first transformer. Each one of the plurality of resonant converters is electrically coupled between the power input terminal and the output capacitor. Each one of the plurality of resonant converters comprises a respective transformer. The plurality of resonant converters are coupled in parallel. The first transformer includes a plurality of coil winding sets with a same turns ratio. The number of the coil winding sets in the first transformer corresponds to the number of the resonant converters. The plurality of coil winding sets are electrically coupled between the power input terminal and the transformers of the plurality of resonant converters in series, respectively.

In one embodiment, the first transformer is a balanced transformer having a turns ratio 1:1: . . . :1, wherein the element number in the equation 1:1: . . . :1 corresponds to the number of the plurality of resonant converters In summary, through employing the third transformer serially coupled between the first transformer of the first resonant converter and the second transformer of the second resonant converter, the resonant currents of the two resonant converters are equalized.

BRIEF DESCRIPTION OF THE DRAWING

FIG. 1 is schematic circuit view of a parallel resonant converter circuit with current-equalization function in accordance with an embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

FIG. 1 is schematic circuit view of a parallel resonant converter circuit with current-equalization function in accordance with an embodiment of the present invention. As shown in FIG. 1, the parallel LLC resonant converter circuit with current-equalization function in the present embodiment includes a power input terminal 10, a power output terminal 11, an output capacitor 12, a first resonant converter 13, a second resonant converter 14 and a third transformer 15. The configurations of the first resonant converter 13 and the second resonant converter 14 are used for exemplary purpose only in the present embodiment, and the present invention is not limited thereto.

The first resonant converter 13 includes a first transformer 130. The first resonant converter 13 is configured to have its first terminal electrically coupled to the power input terminal 10 and its second terminal electrically coupled to the output capacitor 12 and the power output terminal 11. The second resonant converter 14 includes a second transformer 140. The second resonant converter 14 is configured to have its first terminal electrically coupled to the power input terminal 10 and its second terminal electrically coupled to the output capacitor 12 and the power output terminal 11. The third transformer 15 is exemplified by including two coil winding sets. Specifically, one coil winding set of the third transformer 15 is electrically coupled between the power input terminal 10 and the first transformer 130 in series, and the other one coil winding set of the third transformer 15 is electrically coupled between the power input terminal 10 and the second transformer 140 in series. In one embodiment, the third transformer 15 is a balanced transformer having a turns ratio 1:1.

By implementing the third transformer 15 with a balanced transformer having a turns ratio 1:1 and electrically coupling the third transformer 15 with the loop of the first transformer 130 and the second transformer 140 in series, the currents flowing into and flowing out from the first transformer 130 as well as the currents flowing into and flowing out from the second transformer 140 are forced to be equal to each other. In other words, the third transformer 15 can balance the resonant currents of the first resonant converter 13 and the second resonant converter 14 when the first resonant converter 13, the second resonant converter 14 or other related components in the parallel resonant converter circuit of FIG. 1 have tolerances (for example, having different inductances). Thus, the first resonant converter 13, and the second resonant converter 14 being electrically coupled in parallel can have equalized output currents, thereby preventing the first resonant converter 13 and/or the second resonant converter 14 from outputting a power higher than the designed rated power when having a full load.

In one embodiment, the first transformer is a balanced transformer having a turns ratio defined to be 1:1: . . . :1, in which ". . ." refers to omitted "1" for resonant converters higher than three, which means that the number of elements in "1:1 . . . :1" is corresponding to the number of the plurality of resonant converters. In other words, for a total of three resonant converters, the turns ratio based on the above definition is equal to 1:1:1; for a total of four resonant converters, the turns ratio based on the above definition is equal to 1:1:1:1; and for other quantities of resonant converters, the equation is expanded out accordingly in same manner.

It is to be noted that the parallel resonant converter circuit of the present invention is not limited to including two resonant converters therein. In another embodiment of the present invention, the parallel resonant converter circuit may include three or more resonant converters; and correspondingly, the third transformer 15 may have three or more coil winding sets, wherein the number of the coil winding sets in the third transformer 15 correspond to the (total) number of the resonant converters and all of the coil winding sets have the same turns ratio. Accordingly, through the aforementioned configurations as described in the embodiment of present invention, all the resonant converters can have equalized output currents.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A parallel resonant converter circuit with current-equalization function, comprising:
    a power input terminal;
    a power output terminal;
    an output capacitor, comprising a first terminal and a second terminal, wherein the first terminal of the output capacitor is electrically coupled to the power output terminal;
    a first resonant converter, electrically coupled between the power input terminal and the output capacitor, wherein the first resonant converter comprises a first transformer;
    a second resonant converter, electrically coupled between the power input terminal and the output capacitor, wherein the first resonant converter and the second resonant converter are coupled in parallel, and the second resonant converter comprises a second transformer; and
    a third transformer, comprising a first coil winding set and a second coil winding set, wherein the first coil winding set is electrically coupled between the power input terminal and the first transformer in series, and the second coil winding set is electrically coupled between the power input terminal and the second transformer in series.

2. The parallel resonant converter circuit according to claim 1, wherein the third transformer is a balanced transformer having a turns ratio 1:1.

3. A parallel resonant converter circuit with current-equalization function, comprising:
    a power input terminal;
    a power output terminal;
    an output capacitor, comprising a first terminal and a second terminal, wherein the first terminal of the output capacitor is electrically coupled to the power output terminal;
    a plurality of resonant converters, wherein each one of the plurality of resonant converters is electrically coupled between the power input terminal and the output capacitor, each one of the plurality of resonant converters comprises a respective transformer, and the plurality of resonant converters are coupled in parallel; and
    a first transformer, comprising a plurality of coil winding sets with a same turns ratio, wherein the number of the coil winding sets in the first transformer corresponds to the number of the resonant converters, the plurality of coil winding sets are electrically coupled between the power input terminal and the transformers of the plurality of the resonant converters in series, respectively.

4. The parallel resonant converter circuit according to claim 3, wherein the first transformer is a balanced transformer having a turns ratio 1:1: . . . :1, wherein the element number in the equation 1:1: . . . :1 corresponds to the number of the plurality of resonant converters.

* * * * *